(12) United States Patent
Deng et al.

(10) Patent No.: US 11,483,502 B1
(45) Date of Patent: Oct. 25, 2022

(54) BITLINE CONTROL SUPPORTING BINNING MODE FOR PIXEL ARRAYS WITH PHASE DETECTION AUTOFOCUS AND IMAGE SENSING PHOTODIODES

(71) Applicant: OMNIVISION TECHNOLOGIES, INC., Santa Clara, CA (US)

(72) Inventors: Wei Deng, Sunnyvale, CA (US); Tomoyasu Tate, Cupertino, CA (US); Rui Wang, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/339,692

(22) Filed: Jun. 4, 2021

(51) Int. Cl.
*H04N 5/369* (2011.01)
*H04N 5/347* (2011.01)
*H04N 5/351* (2011.01)
*H04N 5/378* (2011.01)
*H04N 5/374* (2011.01)
*H04N 9/04* (2006.01)
*H01L 27/146* (2006.01)
*H04N 5/3745* (2011.01)

(52) U.S. Cl.
CPC ......... *H04N 5/36961* (2018.08); *H04N 5/347* (2013.01); *H04N 5/351* (2013.01); *H04N 5/378* (2013.01); *H04N 5/3745* (2013.01); *H04N 9/0455* (2018.08)

(58) Field of Classification Search
CPC .... H04N 5/36961; H04N 5/347; H04N 5/378; H04N 5/3745; H04N 9/0455; H01L 27/14621; H01L 27/14645; H01L 27/14667
See application file for complete search history.

(56) References Cited

U.S. PATENT DOCUMENTS

| | | | | |
|---|---|---|---|---|
| 2012/0312963 | A1* | 12/2012 | Storm | H04N 5/378 250/208.1 |
| 2018/0070029 | A1* | 3/2018 | Centen | H04N 5/343 |
| 2021/0021774 | A1* | 1/2021 | Ebihara | H04N 5/378 |
| 2021/0067711 | A1* | 3/2021 | Wang | H04N 5/347 |
| 2021/0337169 | A1* | 10/2021 | Chen | H04N 5/36961 |

OTHER PUBLICATIONS

Wang et al., U.S. Appl. No. 16/855,850, filed Apr. 22, 2020, 73 pages.

\* cited by examiner

*Primary Examiner* — Marly S Camargo
(74) *Attorney, Agent, or Firm* — Perkins Coie LLP

(57) ABSTRACT

An imaging device includes a pixel array including pixel circuits arranged into rows and columns. Each bitline of a plurality of bitlines is coupled to a respective column of pixel circuits of the pixel array. The plurality of bitlines is grouped into pairs of bitlines. A plurality of binning circuits is coupled to the plurality of bitlines. Each binning circuit is coupled to a respective pair of bitlines and is responsive to a multi-mode select signal. Each binning circuit is configured to output a binned signal responsive to the first and second bitlines of the respective bitline pair in a first mode. Each binning circuit is configured to output a first signal from a first bitline of the respective bitline pair in a second mode. Each binning circuit is configured to output a second signal from the second bitline of the respective bitline pair in a third mode.

27 Claims, 6 Drawing Sheets

BITLINE CONTROL SUPPORTING BINNING MODE FOR PIXEL ARRAYS WITH PHASE DETECTION AUTOFOCUS AND IMAGE SENSING PHOTODIODES

BACKGROUND INFORMATION

Field of the Disclosure

This disclosure relates generally to image sensors, and in particular but not exclusively, relates to image sensors that include phase detection autofocus and image sensing photodiodes with pixel binning.

Background

Image sensors have become ubiquitous and are now widely used in digital cameras, cellular phones, security cameras as well as in medical, automotive, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing. The technology used to manufacture image sensors has continued to advance at a great pace. For example, the demands of higher resolution and lower power consumption have encouraged the further miniaturization and integration of these devices.

A typical complementary metal oxide semiconductor (CMOS) image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which are read out as analog signals from the column bitlines and converted to digital values to produce digital images (i.e., image data) that represent the external scene.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 2D depicts one example of a pixel array including phase detection auto focus pixel circuits interspersed among image sensing pixel circuits illustrating another example of horizontal binning and vertical binning in accordance with the teachings of the present invention.

FIG. 2E depicts one example of a pixel array including phase detection auto focus pixel circuits interspersed among image sensing pixel circuits illustrating yet another example of horizontal binning and vertical binning in accordance with the teachings of the present invention.

Figure 1:
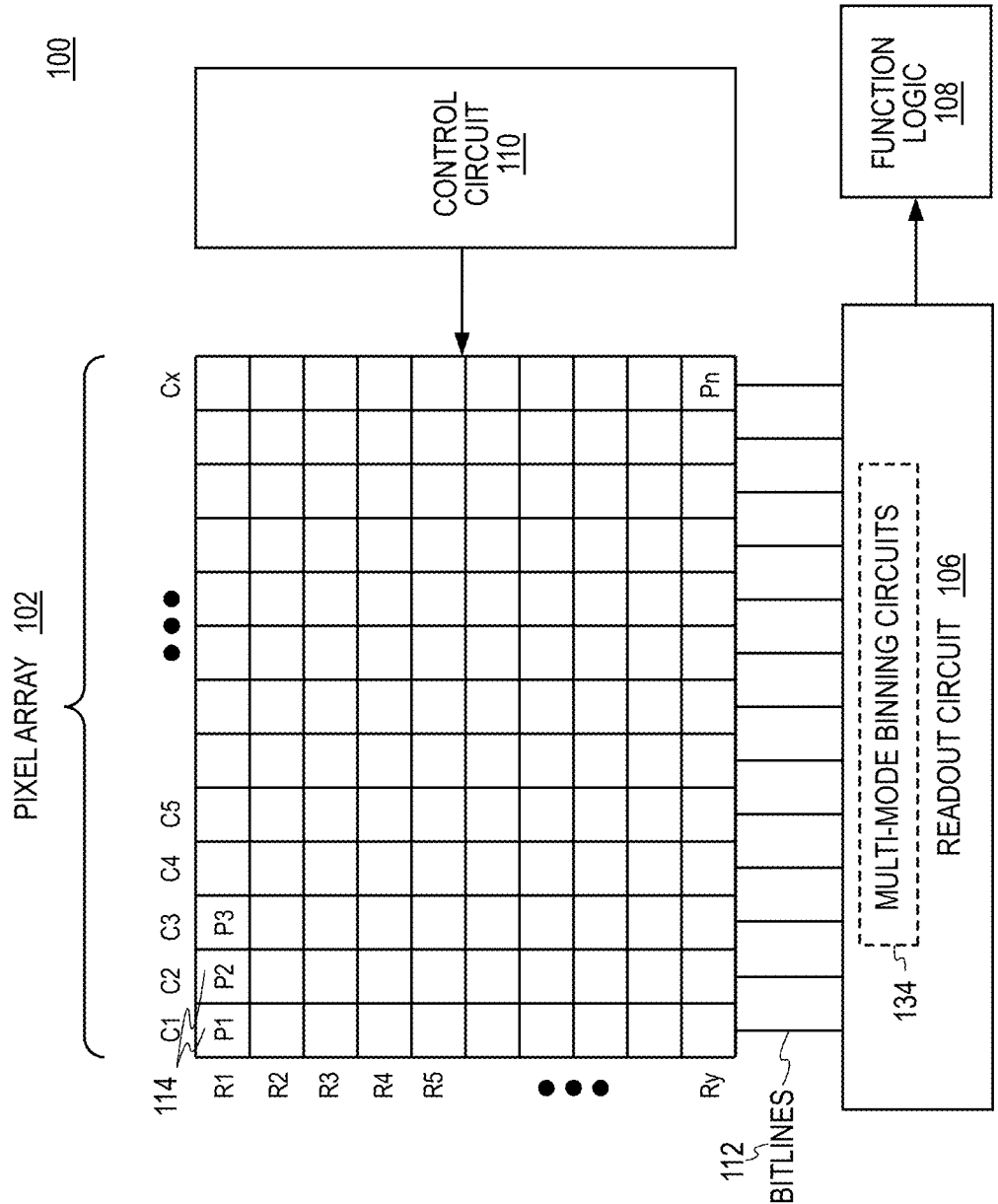
FIG. 1 illustrates one example of an imaging system with a pixel array including phase detection auto focus pixel circuits interspersed among image sensing pixel circuits in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to an imaging system including a pixel array with binned pixel circuits that include phase detection auto focus pixel circuits that are interspersed among image sensing pixel circuits are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of an imaging system include an imaging device having a pixel array with a plurality of pixel circuits arranged into rows and columns in the pixel array. The plurality of pixel circuits includes a plurality of image sensing pixel circuits and a plurality of phase detection autofocus (PDAF) pixel circuits. Each one of the plurality of PDAF pixel circuits is interspersed among the plurality of image sensing pixel circuits in the pixel array. A plurality of photodiodes is included in the pixel array. The plurality of photodiodes include image sensing photodiodes and PDAF photodiodes. Each one of the image sensing pixel circuits includes an image sensing photodiode and each one of the PDAF pixel circuits includes a PDAF photodiode.

The imaging device also includes a plurality of bitlines with each bitline coupled to a respective column of pixel circuits of the pixel array. In the various examples, the plurality of bitlines is grouped into pairs of bitlines. A plurality of multi-mode binning circuits is coupled to the plurality of bitlines with each multi-mode binning circuit coupled to a respective pair of bitlines. In the examples, each binning circuit is configured to be responsive to a multi-mode select signal. In operation, each multi-mode binning circuit is configured to output a binned signal in a first mode. The binned signal output by each multi-mode binning circuit is responsive to the signals that are on the first and second bitlines of the respective bitline pair received by that multi-mode binning circuit. In a second mode, each multi-mode binning circuit is configured to output a first signal from a first bitline of the respective bitline pair. In a third mode, each multi-mode binning circuit is configured to output a second signal from a second bitline of the respective bitline pair.

To illustrate, FIG. 1 illustrates one example of an imaging system 100 with a pixel array including phase detection auto focus (PDAF) pixel circuits interspersed among image sensing pixel circuits in accordance with the teachings of the present invention. In particular, imaging system 100 includes a pixel array 102, a control circuit 110, a readout circuit 106, and function logic 108. In one example, pixel array 102 is a two-dimensional (2D) array of pixel circuits 114 (e.g., P1, P2, . . . , Pn). As illustrated in the depicted example, the pixel circuits 114 are arranged into rows and columns in pixel array 102 to acquire image data or focus data of a person, place, object, etc., in response to incident light. The acquired image data and focus data can then be used to acquire and render a 2D image of the person, place, object, etc. In the examples, the pixel circuits 114 may be image sensing pixel circuits or PDAF pixel circuits. The image sensing pixel circuits include an image sensing photodiode and the PDAF pixel circuits include a PDAF photodiode. As will be shown, in the various examples, the PDAF pixel circuits are interspersed among the image sensing pixel circuits in the pixel array 102 in a PDAF pattern.

In one example, vertical binning may be performed when reading out pixel circuits that are coupled to the same column of the pixel array by using source follower binning. As shown in the example depicted in FIG. 1, the readout circuit 106 includes multi-mode binning circuits 134, which are coupled to read out the pixel array 102 through a plurality bitlines 112. Each bitline 112 is coupled to a respective column of pixel circuits 114 of the pixel array 102. As will be discussed in greater detail below, in the various examples, the plurality of bitlines 112 is grouped into pairs of bitlines. Each pair of bitlines is coupled to respective one of the multi-mode binning circuits 134 in the readout circuit 106.

In operation, each multi-mode binning circuit 134 in readout circuit 106 is configured to operate in a first mode, second mode, or a third mode when reading out a respective pair of bitlines from the pixel array 102. When operating in the first mode, the multi-mode binning circuit 134 is configured to perform horizontal binning on the pair columns when reading out pixel circuits from the same active row of the pixel array 102. Thus, when operating in the first mode, the multi-mode binning circuits 134 are configured to output a binned representation of the first and second signals received from respective pixel circuits coupled to the first and second bitlines of the respective bitline pair. In addition, when operating in the second mode, the multi-mode binning circuit 134 is configured to output the first signal received from the first bitline of the respective bitline pair and drop the second signal received from the second bitline of the respective bitline pair. When operating in the third mode, the multi-mode binning circuit 134 is configured to output the second signal received from the second bitline of the respective bitline pair and drop the first signal received from the first bitline of the respective bitline pair. As will be shown, the second mode and third mode may be utilized by each multi-mode binning circuit 134 when readout out bitline pairs that include an image sensing pixel circuit being read out on one of the bitlines of the bitline pair and a PDAF pixel circuit being read out on the other bitline of the bitline pair.

In the example, the signals that are read out from pixel array 102 by readout circuit 106 may be amplified, digitized, and then transferred to function logic 108. As such, in the various examples, the readout circuit 106 includes amplification circuitry, analog to digital converters (ADCs), or otherwise in addition to the multi-mode binning circuits 134 that are coupled to the column bitline pairs 112. The function logic 108 may store the image data or even manipulate the image data by applying post image effects (e.g., crop, rotate, remove red eye, adjust brightness, adjust contrast, or otherwise).

Figure 2A:
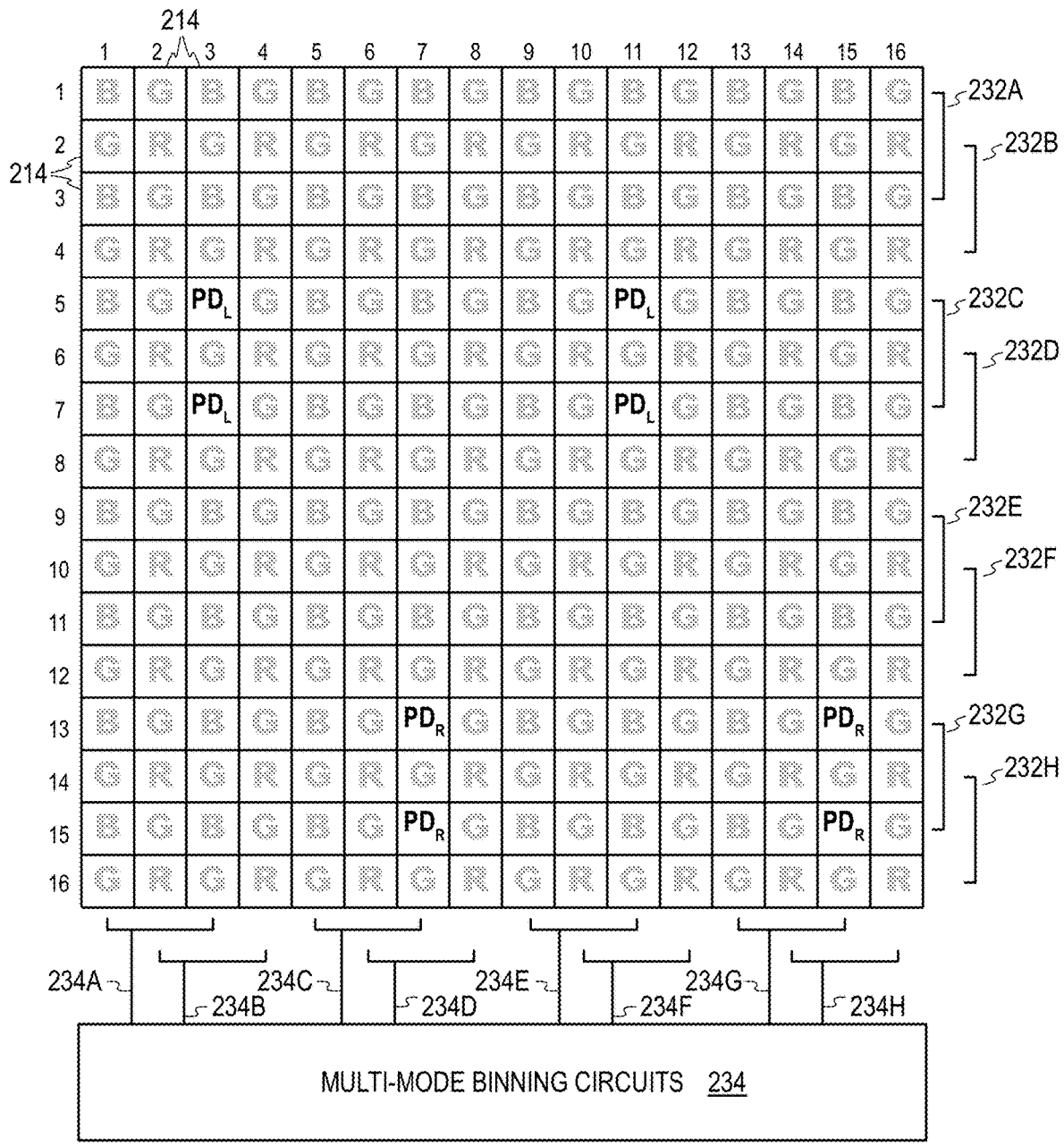
FIG. 2A illustrates greater detail of one example of a pixel array including phase detection auto focus pixel circuits interspersed among image sensing pixel circuits coupled to example multi-mode binning circuits accordance with the teachings of the present invention.

FIG. 2A illustrates greater detail of one example of a pixel array 202A including phase detection auto focus pixel circuits interspersed among image sensing pixel circuits coupled to example multi-mode binning circuits accordance with the teachings of the present invention. It is appreciated that the pixel array 202A of FIG. 2A may be an example showing greater detail of pixel array 102 as shown in FIG. 1, and that similarly named and numbered elements described above are coupled and function similarly below.

As shown in the example depicted in FIG. 2A, pixel array 202 includes a plurality of pixel circuits 214 arranged into rows and columns in pixel array 202. In the various examples, each of the pixel circuits 214 includes a plurality of image sensing pixel circuits and a plurality of phase detection autofocus (PDAF) pixel circuits. As will be shown in greater detail below, a plurality of photodiodes are also included in the pixel array 202A, each of which are included within the plurality of pixel circuits 214. The plurality of photodiodes include image sensing photodiodes and PDAF photodiodes. Each one of the image sensing pixel circuits 214 includes an image sensing photodiode and each one of the PDAF pixel circuits 214 includes a PDAF photodiode.

The example depicted in FIG. 2A also illustrates that a color filter array disposed over the pixel array 202A. As shown in the depicted example, each color filter (e.g., red (R), green (G), blue (B)) of the color filter array is disposed over a respective image sensing pixel circuit 214, which includes an image sensing photodiode. It is noted that each of the PDAF pixel circuits 214 of pixel array 202A are indicated in the depicted example with a "$PD_L$" (e.g., left PDAF photodiodes) or a "$PD_R$" (e.g., right PDAF photodiodes), which are interspersed among the image sensing pixel circuits 214 in the PDAF pattern example shown in FIG. 2A. It is noted that the "$PD_L$" and "$PD_R$" labels are provided for explanation purposes and that in other examples, other labels could be used such as for example "$PD_T$" (e.g., top PDAF photodiode), "$PD_B$" (e.g., bottom PDAF photodiode), etc. In the example depicted in FIG. 2A, the plurality of color filters (R, G, B) of the color filter array are arranged in a Bayer pattern over the image sensing pixel circuits 214. In the depicted example the color filter array is arranged in a 1C pattern such that each color filter is disposed over a respective image sensing pixel circuit 214. As such, the image sensing photodiode that is included in each image sensing pixel circuit 214 is configured to be illuminated with incident light through a respective red (R), green (G), or blue (B) color filter.

In the depicted examples, it is noted that the pixel circuits 214 of pixel array 202A may be binned. As such, information that is generated from each image sensing photodiode or from each PDAF photodiode is summed or combined with information generated from another nearby similar image sensing photodiode or PDAF photodiode to generate combined information, and therefore sum the performance of each individual photodiode to improve the overall performance of the pixel array 202A. For instance, in the example depicted in FIG. 2A, the photodiodes are configured to be binned such that 4 nearby pixel circuits may be binned together. In the illustrated example, the binning is performed with a combination of vertical binning and horizontal binning.

In the example illustrated in FIG. 2A, vertical binning is performed with source follower binning in the respective pixel circuits 214 to read out pairs of photodiodes in the same column and different rows of the pixel array 202A that share the same color or the same type (e.g., similarly colored photodiodes or PDAF photodiodes). To illustrate, FIG. 2A shows that vertical binning 232A can be performed to bin together the pairs of blue (B) pixel circuits and the pairs of green (G) pixel circuits of rows 1 and 3, vertical binning 232B can be performed to bin together the pairs of the green (G) pixel circuits and the pairs of the red (R) pixel circuits of rows 2 and 4, vertical binning 232C can be performed to bin together the pairs of the blue (B) pixel circuits, the pairs of the green (G) pixel circuits, and the pairs of the $PD_L$ pixel circuits of rows 5 and 7, vertical binning 232D can be performed to bin together the pairs of the green (G) pixel circuits and the pairs of the red (R) pixel circuits of rows 6 and 8, vertical binning 232E can be performed to bin together the pairs of the blue (B) pixel circuits and the pairs of the green (G) pixel circuits of rows 9 and 11, vertical binning 232F can be performed to bin together the pairs of the green (G) pixel circuits and the pairs of the red (R) pixel circuits of rows 10 and 12, vertical binning 232G can be performed to bin together the pairs of the blue (B) pixel circuits, the pairs of the green (G) pixel circuits, and the pairs of the $PD_R$ pixel circuits of rows 13 and 15, and vertical binning 232G can be performed to bin together the pairs of the green (G) pixel circuits and the pairs of the red (R) pixel circuits of rows 14 and 16.

Continuing with the example shown in FIG. 2A, horizontal binning may be performed with multi-mode binning circuits 234, which are coupled to pixel array 202A through column bitlines (e.g., column bitlines 112 shown as in FIG. 1) that are coupled to the pixel circuits 214 in the respective columns of pixel array 202A. In the example, each multi-mode binning circuit 234 is coupled a pair of columns of pixel array 202A through a respective pair of bitlines. As such, each multi-mode binning circuit 234 may bin pairs of photodiodes in the same row and in different columns of the pixel array 202A that share the same color or the same type (e.g., similarly colored photodiodes or PDAF photodiodes).

To illustrate, a first bitline of a respective pair of bitlines is coupled to column 1 of pixel array 202A and a second bitline of the respective pair of bitlines is coupled to column 3 of pixel array 202A. As shown in the example, the pattern of color filters of the color filter array (e.g., B, G, B, G, . . . , etc.) that are disposed over the image sensing pixel circuits in column 1 of pixel array 202A is the same pattern of color filters of the color filter array (e.g., B, G, B, G, . . . , etc.) disposed over image sensing pixel circuits in column 3. It is noted that column 2, which is between columns 1 and 3, has a different pattern of color filters than the pattern of color filters over columns 1 and 3. Similarly, the pattern of color filters of the color filter array (e.g., G, R, G, R, . . . , etc.) that are disposed over the image sensing pixel circuits in column 2 of pixel array 202A is the same pattern of color filters of the color filter array (e.g., G, R, G, R, . . . , etc.) disposed over image sensing pixel circuits in column 4. It is noted that column 3, which is between columns 2 and 4, has a different pattern of column filters than the pattern of color filters in columns 1 and 3.

Thus, the example illustrated in FIG. 2A shows that horizontal binning 234A may be performed to bin together the pairs of the blue (B) pixel circuits and the pairs of the green (G) pixel circuits of columns 1 and 3, horizontal binning 234B may be performed to bin together the pairs of the green (G) pixel circuits and the pairs of the red (R) pixel circuits of columns 2 and 4, horizontal binning 234C may be performed to bin together the pairs of the blue (B) pixel circuits and the pairs of the green (G) pixel circuits of rows 5 and 7, horizontal binning 234D may be performed to bin together the pairs of the green (G) pixel circuits and the pairs of the red (R) pixel circuits of columns 6 and 8, horizontal binning 234E may be performed to bin together the pairs of the blue (B) pixel circuits and the pairs of the green (G) pixel circuits of columns 9 and 11, horizontal binning 234F may be performed to bin together the pairs of the green (G) pixel circuits and the red (R) pixel circuits of columns 10 and 12, horizontal binning 234G may be performed to bin together the pairs of the blue (B) pixel circuits and the pairs of the green (G) pixel circuits of columns 13 and 15, and horizontal binning 234G may be performed to bin together the pairs of the green (G) pixel circuits and the pairs of the red (R) pixel circuits of columns 14 and 16.

As shown in the PDAF pattern illustrated in FIG. 2A, in rows 5 and 7, columns 1 and 3 and columns 9 and 11, blue (B) pixel circuits are paired with PDAF $PD_L$ pixel circuits. Similarly, in rows 13 and 15, columns 5 and 7 and columns 13 and 15, blue (B) pixel circuits are paired with PDAF $PD_R$ pixel circuits. As a result, multi-mode binning circuits 234 are configured, if operating in a first mode of operation, to horizontally bin blue (B) pixel circuits with PDAF ($PD_L$, $PD_R$) pixel circuits. If this horizontal binning is performed on pairs that include image sensing pixel circuits and PDAF pixel circuits, it is noted that the phase detection information would be lost in the averaged binned output signal. Furthermore, the binned signal would also require phase detection correction as the sensitivity of PDAF pixel circuits are generally different from the of normal image sensing pixel circuits.

As will described in greater detail below, the multi-mode binning circuits 234 also include a second mode of operation and a third mode operation. For instance, when operating in the second mode of operation, the pixel circuit coupled to the first bitline of the bitline pair that is coupled to the multi-mode binning circuit 234 is selected while the pixel circuit coupled to the second bitline of the bitline pair that is coupled to the multi-mode binning circuit 234 is dropped. Thus, in the example given above, the signals of the blue (B) pixel circuits will be output by the multi-mode binning circuits 234 when operating in the second mode of operation while the signals output by the PDAF ($PD_L$ or $PD_R$) pixel circuits are dropped.

Continuing with the example, when operating in the third mode of operation, the pixel circuit coupled to the second bitline of the bitline pair that is coupled to the multi-mode binning circuit 234 is selected while the pixel circuit coupled to the first bitline of the bitline pair that is coupled to the multi-mode binning circuit 234 is dropped. Thus, in the example given above, the signals of the PDAF ($PD_L$ or $PD_R$) pixel circuits will be output by the multi-mode binning circuits 234 when operating in the second mode of operation while the signals of the blue (B) pixel circuits are dropped.

Thus, it is appreciated that each multi-mode binning circuit 234 is configured to operate in the first mode to average or to bin the signals received from the first and second bitlines of the respective pair that is coupled to the multi-mode binning circuits 234. In addition, each multi-mode binning circuit 234 is also configured to operate in the second mode or in the third mode when one of the first and second bitlines of the respective bitline pair that is coupled to the multi-mode binning circuit 234 is coupled to receive a PDAF signal from a PDAF pixel circuit while the other one of the first and second bitlines of the respective bitline pair is coupled to receive an image sensing signal from a normal image sensing pixel circuit.

It is further appreciated that multiple signals from pixel circuits from multiple rows of the column may be received by each of the first and second bitlines of the respective bitline pair in order to additionally perform vertical source follower binning as discussed above. In other words, the first bitline of the respective bitline pair may be coupled to receive first and second signals from pixel circuits from two different rows that are coupled the first bitline, while the second bitline of the respective bitline pair may be coupled to receive third and fourth signals from pixel circuits from the two different rows that are coupled to the second bitline. In this example, both vertical binning as well as horizontal binning may be performed in accordance with the teachings of the present invention.

Figure 2B:
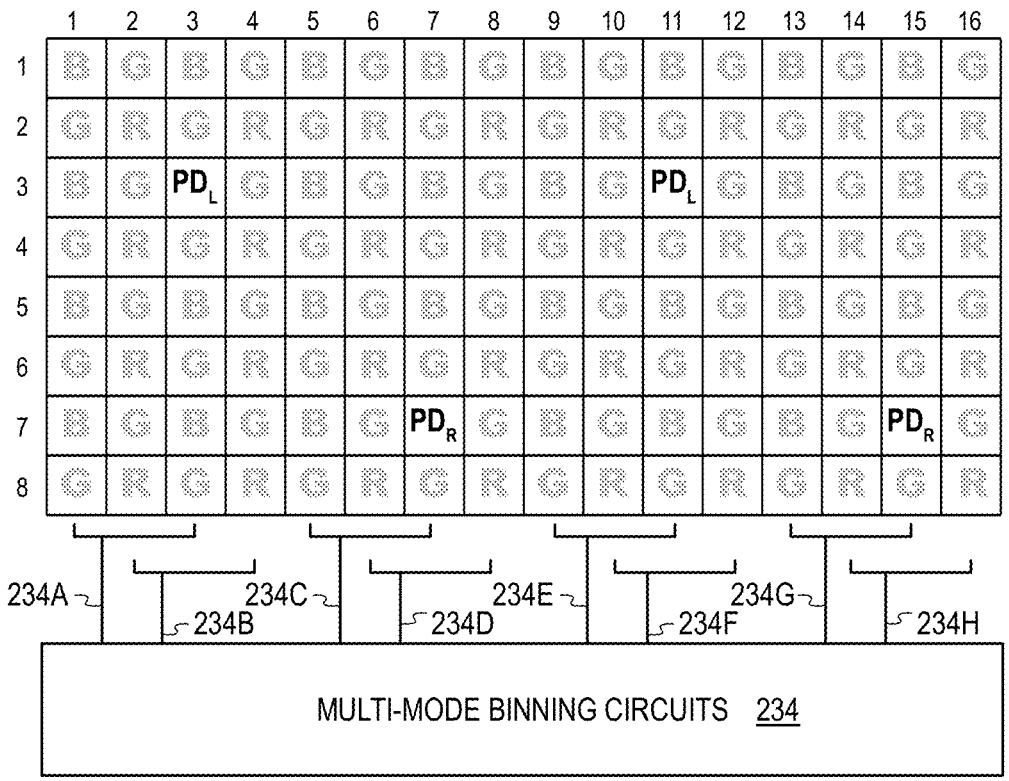
FIG. 2B depicts one example of a pixel array including phase detection auto focus pixel circuits interspersed among image sensing pixel circuits illustrating an example of vertical binning in accordance with the teachings of the present invention.

To illustrate, FIG. 2B depicts one example of a pixel array 202B including phase detection auto focus pixel circuits interspersed among image sensing pixel circuits illustrating an example of vertical binning in accordance with the teachings of the present invention. It is appreciated that pixel array 202B of FIG. 2B may be an example that illustrates vertical binning of pixel array 202A of FIG. 2A, or an example illustrating vertical binning of pixel array 102 as shown in FIG. 1, and that similarly named and numbered elements described above are coupled and function similarly below.

For instance, as illustrated in the example pixel array 202A depicted in FIG. 2A, vertical binning 232A is performed to bin together the pairs of blue (B) pixel circuits and the pairs of green (G) pixel circuits of rows 1 and 3 of pixel array 202A. As such, row 1 in example pixel array 202B depicted in FIG. 2B illustrates the resulting blue (B) and green (G) pixel circuits, which are the averaged or binned rows 1 and 3 of pixel 202A of FIG. 2A.

Similarly, vertical binning 232B is performed to bin together the pairs of green (G) pixel circuits and the pairs of red (R) pixel circuits of rows 2 and 4 of pixel array 202A. As such, row 2 in example pixel array 202B depicted in FIG. 2B illustrates the resulting green (G) and red (R) pixel circuits, which are the averaged or binned rows 2 and 4 of pixel 202A of FIG. 2A.

Similarly, vertical binning 232C is performed to bin together the pairs of blue (B) pixel circuits, the pairs of green (G) pixel circuits, and the pairs of PDAF pixel circuits (e.g., $PD_L$) of rows 5 and 7 of pixel array 202A. As such, row 3 in example pixel array 202B depicted in FIG. 2B illustrates the resulting blue (B), green (G), and PDAF ($PD_L$) pixel circuits, which are the averaged or binned rows 5 and 7 of pixel 202A of FIG. 2A.

Similarly, vertical binning 232D is performed to bin together the pairs of green (G) pixel circuits and the pairs of red (R) pixel circuits of rows 6 and 8 of pixel array 202A. As such, row 4 in example pixel array 202B depicted in FIG. 2B illustrates the resulting green (G) and red (R) pixel circuits, which are the averaged or binned rows 6 and 8 of pixel 202A of FIG. 2A.

Similarly, vertical binning 232E is performed to bin together the pairs of blue (B) pixel circuits and the pairs of green (G) pixel circuits of rows 9 and 11 of pixel array 202A. As such, row 5 in example pixel array 202B depicted in FIG. 2B illustrates the resulting blue (B) and green (G) pixel circuits, which are the averaged or binned rows 9 and 11 of pixel 202A of FIG. 2A.

Similarly, vertical binning 232F is performed to bin together the pairs of green (G) pixel circuits and the pairs of red (R) pixel circuits of rows 10 and 12 of pixel array 202A. As such, row 6 in example pixel array 202B depicted in FIG. 2B illustrates the resulting green (G) and red (R) pixel circuits, which are the averaged or binned rows 10 and 12 of pixel 202A of FIG. 2A.

Similarly, vertical binning 232G is performed to bin together the pairs of blue (B) pixel circuits, the pairs of green (G) pixel circuits, and the pairs of PDAF pixel circuits (e.g., $PD_R$) of rows 13 and 15 of pixel array 202A. As such, row 7 in example pixel array 202B depicted in FIG. 2B illustrates the resulting blue (B), green (G), and PDAF ($PD_L$) pixel circuits, which are the averaged or binned rows 13 and 15 of pixel 202A of FIG. 2A.

Similarly, vertical binning 232H is performed to bin together the pairs of green (G) pixel circuits and the pairs of red (R) pixel circuits of rows 14 and 16 of pixel array 202A. As such, row 8 in example pixel array 202B depicted in FIG. 2B illustrates the resulting green (G) and red (R) pixel circuits, which are the averaged or binned rows 14 and 16 of pixel 202A of FIG. 2A.

Similar to the example pixel 202A shown in FIG. 2A, FIG. 2B shows that the multi-mode binning circuits 234 are configured to perform horizontal binning 234A to bin together the pairs of the blue (B) pixel circuits and the pairs of the green (G) pixel circuits of columns 1 and 3, horizontal binning 234B can be performed to bin together the pairs of the green (G) pixel circuits and the pairs of the red (R) pixel circuits of columns 2 and 4, horizontal binning 234C can be performed to bin together the pairs of the blue (B) pixel circuits and the pairs of the green (G) pixel circuits of rows 5 and 7, horizontal binning 234D can be performed to bin together the pairs of the green (G) pixel circuits and the pairs of the red (R) pixel circuits of columns 6 and 8, horizontal binning 234E can be performed to bin together the pairs of the blue (B) pixel circuits and the pairs of the green (G) pixel circuits of columns 9 and 11, horizontal binning 234F can be performed to bin together the pairs of the green (G) pixel circuits and the red (R) pixel circuits of columns 10 and 12, horizontal binning 234G can be performed to bin together the pairs of the blue (B) pixel circuits and the pairs of the green (G) pixel circuits of columns 13 and 15, and horizontal binning 234G can be performed to bin together the pairs of the green (G) pixel circuits and the pairs of the red (R) pixel circuits of columns 14 and 16.

Figure 2C:
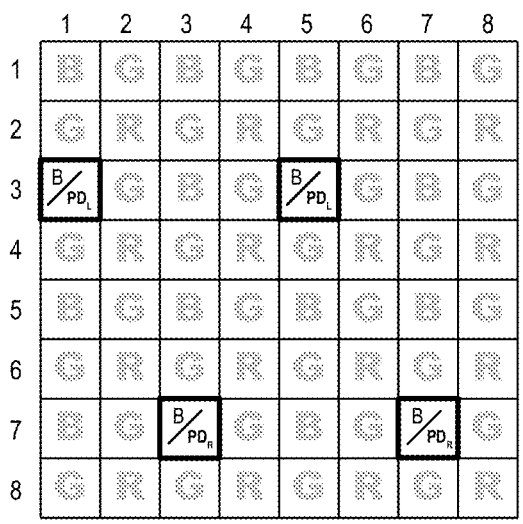
FIG. 2C depicts one example of a pixel array including phase detection auto focus pixel circuits interspersed among image sensing pixel circuits illustrating an example of horizontal binning and vertical binning in accordance with the teachings of the present invention.

To illustrate, FIG. 2C depicts one example of a pixel array 202C including phase detection auto focus pixel circuits interspersed among image sensing pixel circuits illustrating an example of horizontal binning and vertical binning in accordance with the teachings of the present invention. It is appreciated that pixel array 202C of FIG. 2C may be an example that illustrates horizontal binning performed on the pixel array 202B of FIG. 2B, or horizontal and vertical binning performed on pixel array 202A of FIG. 2A, or an example illustrating horizontal and vertical binning performed on pixel array 102 as shown in FIG. 1, and that similarly named and numbered elements described above are coupled and function similarly below.

For instance, as illustrated in the example pixel array 202B depicted in FIG. 2B, horizontal binning 234A is performed by the respective multi-mode binning circuit 234 operating in the first mode to bin together the pairs of blue (B) pixel circuits and the pairs of green (G) pixel circuits of columns 1 and 3 of pixel array 202B. As such, column 1 in example pixel array 202C depicted in FIG. 2C illustrates the resulting blue (B) and green (G) pixel circuits, which are the averaged or binned columns 1 and 3 of pixel 202B of FIG. 2B.

It is noted, however, that with the respective multi-binning circuit 234 operating in the first mode, the resulting binned pixel circuit (B/$PD_L$) shown in pixel array 202C in column 1 row 3 is the average of the blue (B) pixel circuit and PDAF ($PD_L$) pixel circuit in row 3 columns 1 and 3 of pixel array 202B of FIG. 2B. As will be shown in FIG. 2D below, the respective multi-binning circuit 234 can be operated in the second mode when reading out the blue (B) pixel circuit and PDAF ($PD_L$) pixel circuit in row 3 columns 1 and 3 of pixel array 202B of FIG. 2B to preserve the blue (B) pixel circuit information and drop the PDAF ($PD_L$) pixel circuit information. Similarly, as will be shown in FIG. 2E below, the respective multi-binning circuit 234 can be operated in the third mode when reading out the blue (B) pixel circuit and PDAF ($PD_L$) pixel circuit in row 3 columns 1 and 3 of pixel array 202B of FIG. 2B to preserve the PDAF ($PD_L$) pixel circuit information and drop the blue (B) pixel circuit information.

Continuing with the depicted example, horizontal binning 234B is performed by the respective multi-mode binning circuit 234 operating in the first mode to bin together the pairs of green (G) pixel circuits and the pairs of red (R) pixel circuits of columns 2 and 4 of pixel array 202B. As such, column 2 in example pixel array 202C depicted in FIG. 2C illustrates the resulting green (G) and red (R) pixel circuits, which are the averaged or binned columns 2 and 4 of pixel 202B of FIG. 2B.

Similarly, horizontal binning 234C is performed by the respective multi-mode binning circuit 234 operating in the first mode to bin together the pairs of blue (B) pixel circuits and the pairs of green (G) pixel circuits of columns 5 and 7 of pixel array 202B. As such, column 3 in example pixel array 202C depicted in FIG. 2C illustrates the resulting blue (B) and green (G) pixel circuits, which are the averaged or binned columns 1 and 3 of pixel 202B of FIG. 2B.

It is noted, however, that with the respective multi-binning circuit 234 operating in the first mode, the resulting binned pixel circuit (B/$PD_R$) shown in pixel array 202C in column 3 row 7 is the average of the blue (B) pixel circuit and PDAF ($PD_R$) pixel circuit in row 7 columns 5 and 7 of pixel array 202B of FIG. 2B. As will be shown in FIG. 2D below, the respective multi-binning circuit 234 can be operated in the second mode when reading out the blue (B) pixel circuit and PDAF ($PD_L$) pixel circuit in row 7 columns 5 and 7 of pixel array 202B of FIG. 2B to preserve the blue (B) pixel circuit information and drop the PDAF ($PD_R$) pixel circuit information. Similarly, as will be shown in FIG. 2E below, the respective multi-binning circuit 234 can be operated in the third mode when reading out the blue (B) pixel circuit and PDAF ($PD_R$) pixel circuit in row 7 columns 5 and 7 of pixel array 202B of FIG. 2B to preserve the PDAF ($PD_R$) pixel circuit information and drop the blue (B) pixel circuit information.

Continuing with the depicted example, horizontal binning 234D is performed by the respective multi-mode binning circuit 234 operating in the first mode to bin together the pairs of green (G) pixel circuits and the pairs of red (R) pixel circuits of columns 6 and 8 of pixel array 202A. As such, column 4 in example pixel array 202B depicted in FIG. 2B illustrates the resulting green (G) and red (R) pixel circuits, which are the averaged or binned columns 6 and 8 of pixel 202B of FIG. 2B.

Similarly, horizontal binning 234E is performed by the respective multi-mode binning circuit 234 operating in the first mode to bin together the pairs of blue (B) pixel circuits and the pairs of green (G) pixel circuits of columns 9 and 11 of pixel array 202B. As such, column 5 in example pixel array 202C depicted in FIG. 2C illustrates the resulting blue (B) and green (G) pixel circuits, which are the averaged or binned columns 9 and 11 of pixel 202B of FIG. 2B.

It is noted, however, that with the respective multi-binning circuit 234 operating in the first mode, the resulting binned pixel circuit (B/$PD_L$) shown in pixel array 202C in column 5 row 3 is the average of the blue (B) pixel circuit and PDAF ($PD_L$) pixel circuit in row 3 columns 9 and 11 of pixel array 202B of FIG. 2B. As will be shown in FIG. 2D below, the respective multi-binning circuit 234 can be operated in the second mode when reading out the blue (B) pixel circuit and PDAF (PD$_L$) pixel circuit in row 3 columns 9 and 11 of pixel array 202B of FIG. 2B to preserve the blue (B) pixel circuit information and drop the PDAF (PD$_L$) pixel circuit information. Similarly, as will be shown in FIG. 2E below, the respective multi-binning circuit 234 can be operated in the third mode when reading out the blue (B) pixel circuit and PDAF (PD$_L$) pixel circuit in row 3 columns 9 and 11 of pixel array 202B of FIG. 2B to preserve the PDAF (PD$_L$) pixel circuit information and drop the blue (B) pixel circuit information.

Continuing with the depicted example, horizontal binning 234F is performed is performed by the respective multi-mode binning circuit 234 operating in the first mode to bin together the pairs of green (G) pixel circuits and the pairs of red (R) pixel circuits of columns 10 and 12 of pixel array 202B. As such, column 6 in example pixel array 202C depicted in FIG. 2C illustrates the resulting green (G) and red (R) pixel circuits, which are the averaged or binned columns 10 and 12 of pixel 202B of FIG. 2B.

Similarly, horizontal binning 234G is performed by the respective multi-mode binning circuit 234 operating in the first mode to bin together the pairs of blue (B) pixel circuits and the pairs of green (G) pixel circuits of columns 13 and 15 of pixel array 202B. As such, column 7 in example pixel array 202C depicted in FIG. 2C illustrates the resulting blue (B) and green (G) pixel circuits, which are the averaged or binned columns 13 and 15 of pixel 202B of FIG. 2B.

It is noted, however, that with the respective multi-binning circuit 234 operating in the first mode, the resulting binned pixel circuit (B/PD$_R$) shown in pixel array 202C in column 7 row 7 is the average of the blue (B) pixel circuit and PDAF (PD$_R$) pixel circuit in row 7 columns 13 and 15 of pixel array 202B of FIG. 2B. As will be shown in FIG. 2D below, the respective multi-binning circuit 234 can be operated in the second mode when reading out the blue (B) pixel circuit and PDAF (PD$_L$) pixel circuit in row 7 columns 13 and 15 of pixel array 202B of FIG. 2B to preserve the blue (B) pixel circuit information and drop the PDAF (PD$_R$) pixel circuit information. Similarly, as will be shown in FIG. 2E below, the respective multi-binning circuit 234 can be operated in the third mode when reading out the blue (B) pixel circuit and PDAF (PD$_R$) pixel circuit in row 7 columns 13 and 15 of pixel array 202B of FIG. 2B to preserve the PDAF (PD$_R$) pixel circuit information and drop the blue (B) pixel circuit information.

Continuing with the depicted example, horizontal binning 234H is performed by the respective multi-mode binning circuit 234 operating in the first mode to bin together the pairs of green (G) pixel circuits and the pairs of red (R) pixel circuits of columns 14 and 16 of pixel array 202B. As such, column 8 in example pixel array 202C depicted in FIG. 2C illustrates the resulting green (G) and red (R) pixel circuits, which are the averaged or binned columns 14 and 16 of pixel 202B of FIG. 2B.

Figures 2D, 2E:
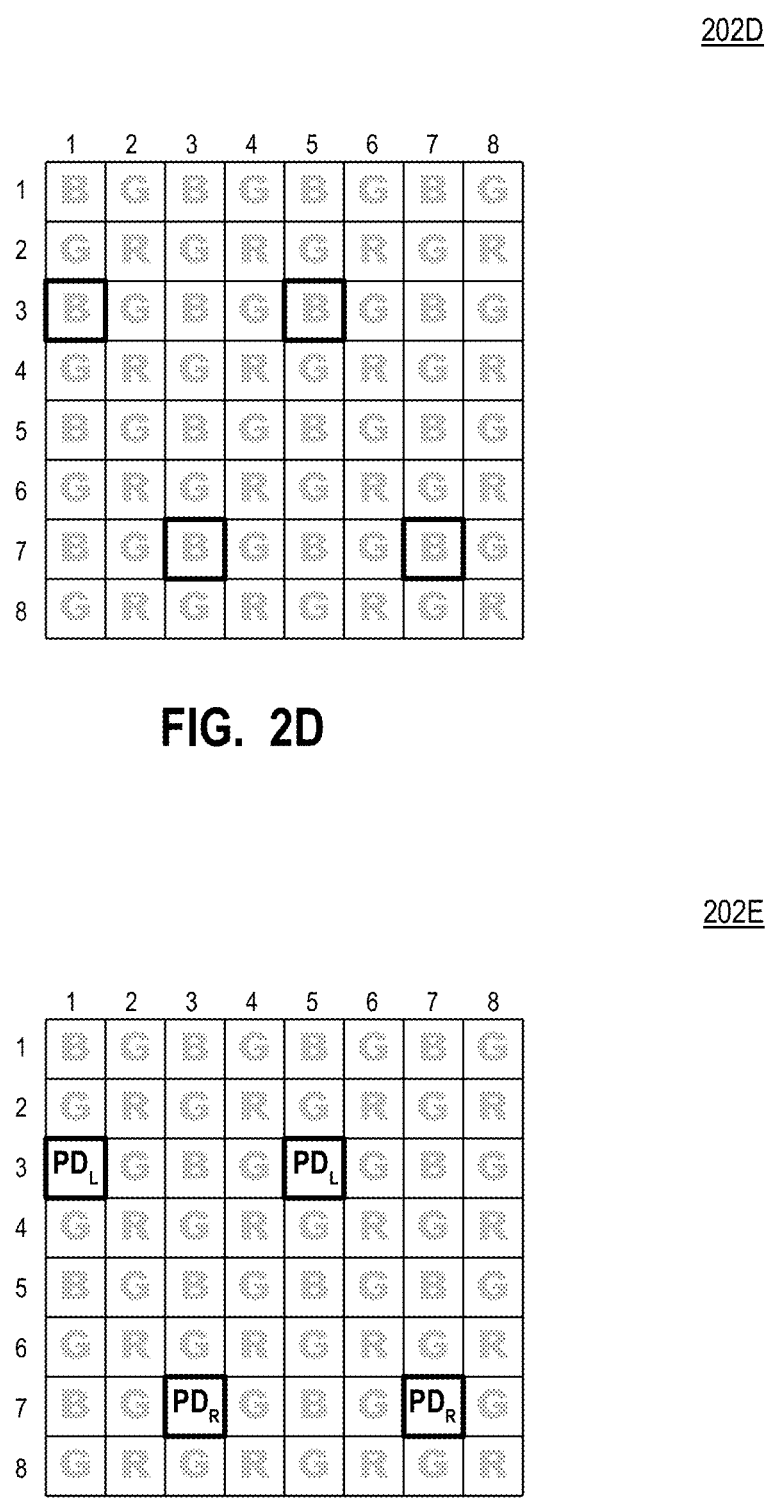

FIG. 2D depicts one example of a pixel array 202D including phase detection auto focus pixel circuits interspersed among image sensing pixel circuits illustrating another example of horizontal binning and vertical binning in accordance with the teachings of the present invention. As mentioned previously, FIG. 2D in particular illustrates another example of pixel array 202C of FIG. 2C in which the respective multi-mode binning circuit 234 is operated in a second mode when reading out pixel array 202B of FIG. 2B columns 1 and 3 row 3, columns 5 and 7 row 7, columns 9 and 11 row 3, and columns 13 and 15 row 7 to preserve the blue (B) pixel circuit information and drop the PDAF pixel circuit information. As such, pixel array 202D of FIG. 2D shows that the resulting readouts in column 1 row 3, column 3 row 7, column 5 row 3, and column 7 row 7, which are all indicated with heavy lines in FIG. 2D, are all blue (B) pixel circuit readouts as shown.

FIG. 2E depicts one example of a pixel array 202E including phase detection auto focus pixel circuits interspersed among image sensing pixel circuits illustrating yet another example of horizontal binning and vertical binning during a readout operation in accordance with the teachings of the present invention. As mentioned previously, FIG. 2E in particular illustrates yet another example of pixel array 202C of FIG. 2C in which the respective multi-mode binning circuit 234 is operated in a third mode when reading out pixel array 202B of FIG. 2B columns 1 and 3 row 3, columns 5 and 7 row 7, columns 9 and 11 row 3, and columns 13 and 15 row 7 to preserve the PDAF (PD$_L$ or PD$_R$) pixel circuit information and drop the blue (B) pixel circuit information. As such, pixel array 202E of FIG. 2E shows that the resulting readouts in column 1 row 3, column 3 row 7, column 5 row 3, and column 7 row 7, which are all indicated with heavy lines in FIG. 2D, are all PDAF (PD$_L$ or PD$_R$) pixel circuit readouts as shown.

Figure 3:
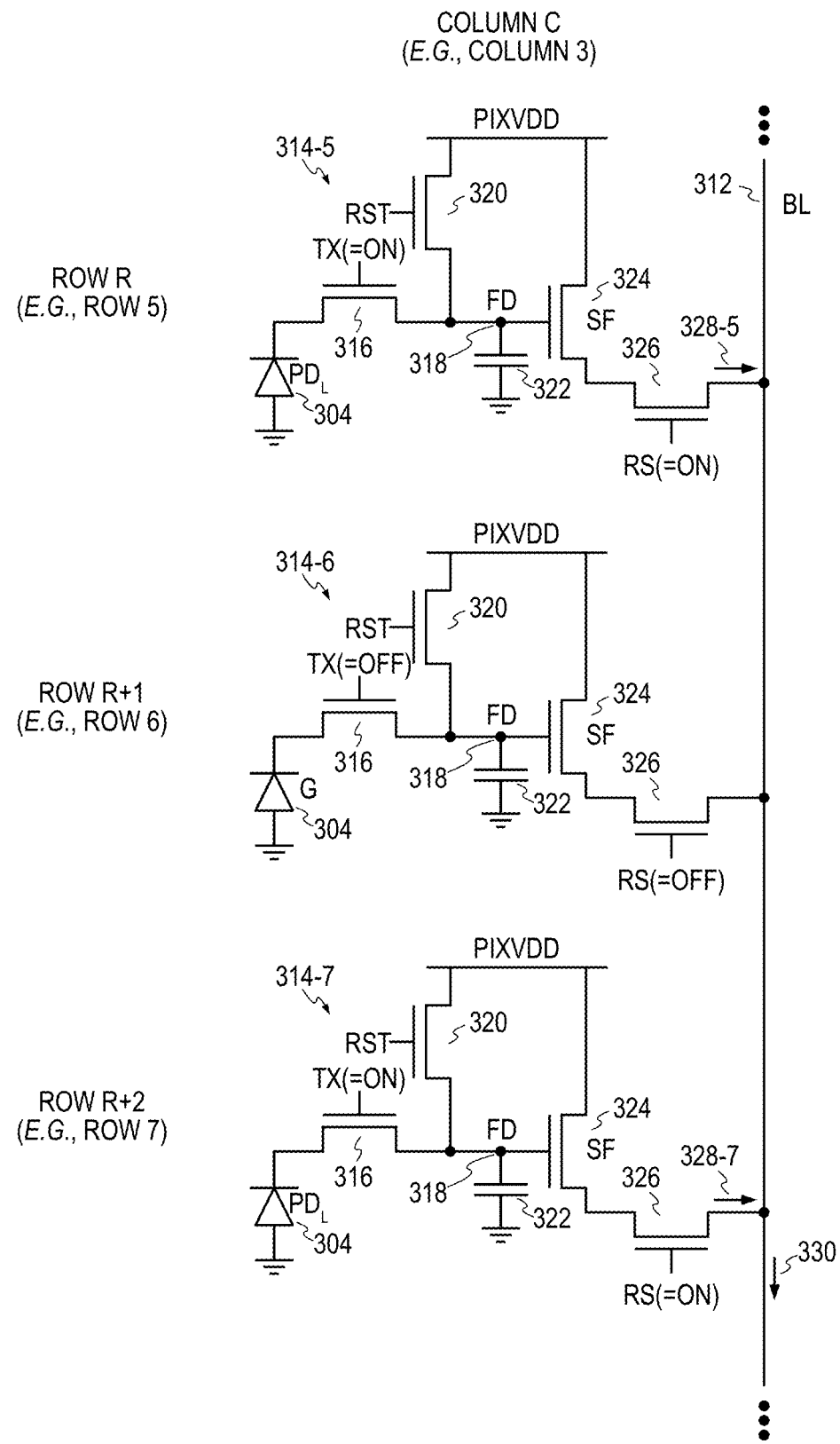
FIG. 3 illustrates one example of a column of vertically binned pixel circuits coupled to a column bitline included in an imaging system with a pixel array including phase detection auto focus pixel circuits interspersed among image sensing pixel circuits in accordance with the teachings of the present invention.

FIG. 3 illustrates one example of a column of vertically binned pixel circuits 314-5, 314-6, 314-7 that are coupled to a column bitline 312 included in an imaging system with a pixel array including phase detection auto focus pixel circuits interspersed among image sensing pixel circuits in accordance with the teachings of the present invention. It is appreciated that the example pixel circuits 314-5, 314-6, 314-7 illustrated in FIG. 3 may be examples showing greater detail of the pixel circuits included in column 3 rows 5-7 of pixel array 202A shown in FIG. 2A, or of pixel circuits included in pixel array 102 as shown in FIG. 1, and that similarly named and numbered elements described above are coupled and function similarly below. It is appreciated of course the column of example pixel circuits 314-5, 314-6, 314-7 are illustrated for explanation purposes, and that other columns or rows of pixel circuits may share similar features and functionality in accordance with the teachings of the present invention.

As shown in the example depicted in FIG. 3, each one of the pixel circuits 314-5, 314-6, 314-7 include a photodiode 304 that is configured to generate charge in response to incident light. Similar to the example provided in FIG. 2A in column 3 rows 5-7, in the example illustrated in FIG. 3, pixel circuits 314-5 and 314-7 are PDAF pixel circuits and the photodiodes 304 of pixel circuits 314-5 and 314-7 are therefore PDAF (e.g., PD$_L$) photodiodes. In addition, pixel circuit 314-6 is a normal image sensing pixel circuit and the photodiode 304 of pixel circuit 314-6 is therefore an image sensing (e.g., blue (B)) photodiode.

The example depicted in FIG. 3 also illustrates that each one of the pixel circuits 314-5, 314-6, 314-7 includes transfer transistor 316 that is coupled between the respective photodiode 314 and a respective floating diffusion FD 318. In various examples, each one of the pixel circuits 314-5, 314-6, 314-7 also includes a respective capacitor 322 coupled to each respective floating diffusion FD 318. Each transfer transistor is configured to be controlled in response to a respective transfer control signal TX. As illustrated in the example, the transfer control signals TX for pixel circuit 314-5 and pixel circuit 314-7 are configured to be ON while the remaining transfer control signals TX for the other pixel circuits in the column, which includes pixel circuit 314-6, are configured to be OFF during a binned vertical readout of pixel circuit 314-5 and pixel circuit 314-7. In operation, charge that is photogenerated in each photodiode 304 is configured to be transferred to the floating diffusion 318 in response to the transfer transistor being turned ON during a readout operation.

The example shown in FIG. 3 shows that a reset transistor 320 and a source follower transistor SF 324 are coupled a voltage supply PIXVDD and to floating diffusion 318 in each one of the pixel circuits 314-5, 314-6, 314-7. In operation, the reset transistor 320 is coupled to reset the floating diffusion 318 in response to a reset signal RST. In the example, the source follower transistor SF 324 has a gate terminal that is coupled to the floating diffusion 318 to generate an output signal (e.g., 328-5, 328-7) in response to the charge that has been transferred to floating diffusion 318 from the respective photodiodes 304 through the respective transfer transistors 316. A row select transistor 326 is coupled to the source follower transistor SF 324. As shown in the depicted example, the source follower transistor SF 324 and the row select transistor 326 are coupled between the voltage supply PIXVDD and the bitline 312. In operation, each row select transistor 326 is configured to couple the output signal (e.g., 328-5, 328-7) generated by the source follower transistor SF 324 to the bitline 312 in response to a row select signal RS. As illustrated in the depicted example, the row select signals RS for pixel circuit 314-5 and pixel circuit 314-7 are ON and the row select signal RS for the remaining pixel circuits in the column, which includes pixel circuit 314-6, are OFF during the depicted readout operation.

Therefore, during a readout operation with vertical source follower binning as illustrated in the example depicted in FIG. 3, source follower transistors 326 in pixel circuits 314-5 and 314-7 are both turned ON simultaneously to couple the output signals 328-5 and 328-7 to bitline 312. Thus, in the depicted example, bitline 312 is coupled to receive two output signals 328-5 and 328-7 to perform vertical source follower binning of the signals from pixel circuits 314-5 and 314-7. In one example, the output signals 328-5 and 328-7 that are generated by the source follower transistors SF 324 of pixel circuits 314-5 and 314-7 comprise currents, which are received by bitline 312. As such, a total output signal 330 through bitline 312 at a particular time is the sum or combined total of all of the currents of the signals 328-5 and 328-7 received from each respective pixel circuit 314-5 and 314-7 that is coupled to the bitline 312 at that time. It also is appreciated that by reading out two rows of pixel circuits from the pixel array simultaneously as shown, vertical readout speed is increased by 2×.

Figure 4:
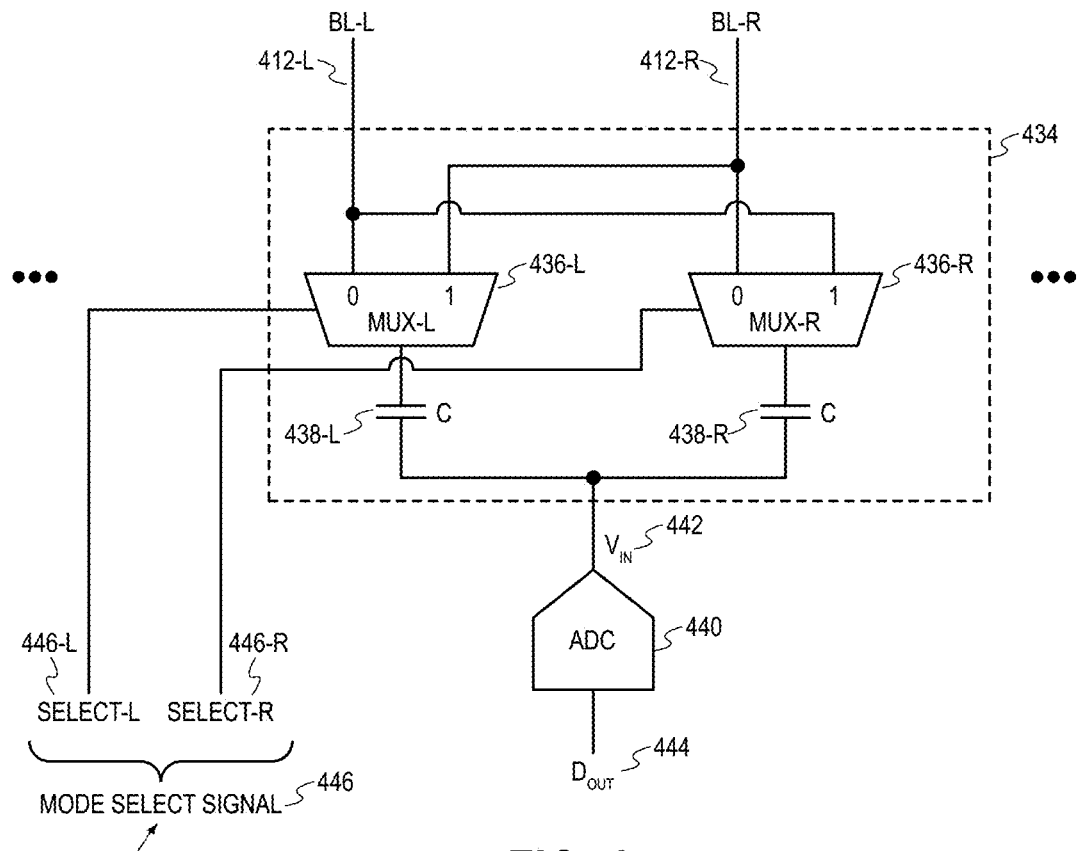
FIG. 4 illustrates one example of a multi-mode binning circuit coupled to multiple column bitlines coupled to pixel circuits included in a pixel array including phase detection auto focus pixel circuits interspersed among image sensing pixel circuits in accordance with the teachings of the present invention.

FIG. 4 illustrates one example of a multi-mode binning circuit 434 coupled to multiple column bitlines BL-L 412-L and BL-R 412-R, which are coupled to pixel circuits included in a pixel array including phase detection auto focus pixel circuits interspersed among image sensing pixel circuits in accordance with the teachings of the present invention. It is appreciated that the example multi-mode binning circuit 434 illustrated in FIG. 4 may be an example showing greater detail of one of the plurality of multi-mode binning circuits 234 illustrated in FIG. 2A and FIG. 2B, or example showing greater detail of one of the plurality of multi-mode binning circuits 134 illustrated in FIG. 1, and that similarly named and numbered elements described above are coupled and function similarly below.

As shown in the depicted example, multi-mode binning circuit 434 is coupled to receive a mode select signal 446 and a pair of bitlines, which includes a first bitline BL-L 412-L and a second bitline BL-R 412-R. In the example, an output of the multi-mode binning circuit 434 is coupled to be received by an input $V_{IN}$ 442 of an analog to digital converter (ADC) 440, which is configured to generate a digital output $D_{OUT}$ 444 in response to the analog input $V_{IN}$ 442. As shown in the depicted example, the mode select signal 446 includes a first select signal SELECT-L 446-L and a second select signal SELECT-R 446-R.

In operation, the mode select signal 446 is configured to indicate a first mode (e.g., "00" or "11"), a second mode (e.g., "01"), or a third mode (e.g., "10"). When operating in the first mode, the multi-mode binning circuit 434 is configured to output a horizontally binned or averaged signal of the signals received from the first bitline BL-L 412-L and a second bitline BL-R 412-R. When operating in the second mode, the multi-mode binning circuit 434 is configured to output the signal received from the first bitline BL-L 412-L and drop the signal received from the second bitline BL-R 412-R. When operating in the third mode, the multi-mode binning circuit 434 is configured to output the signal received from the second bitline BL-R 412-R and drop the signal received from the first bitline BL-L 412-L.

In the depicted example, the first bitline BL-L 412-L is coupled to a first column of the pixel array and the second bitline BL-R 412-R is coupled to a second column of the pixel array. In the various examples, the pattern of color filters over the first column of the pixel array is the same pattern of color filters over the second column of the pixel array. For instance, in the example pixel array 202A depicted in FIG. 2A, the first and second columns of the bitline pair may be columns 1 and 3, 2 and 4, 5 and 7, 6 and 8, 9 and 11, 10 and 12, 13 and 15, or 14 and 16. Thus, in the depicted example, there is a third column of the pixel array, which is covered by a different pattern of color filters, that is disposed between the first and second columns that are coupled to the first and second bitlines BL-L 412-L and BL-R 412-R.

The example illustrated in FIG. 4 illustrates that multi-mode binning circuit 434 includes a first switching circuit or multiplexer MUX-L 436-L, and a second switching circuit or multiplexer MUX-R 436-R. The first and second multiplexers MUX-L 436-L and MUX-R 436-R each have first and second inputs, a select input, and an output as shown. The output of multi-mode binning circuit 434 is coupled to the output of first multiplexer MUX-L 436-L through a first capacitor 438-L and the output of second multiplexer MUX-R 436-R through a second capacitor 438-R. In one example, both the first and second capacitors 438-L and 438-R have the same capacitance value C.

In the example, the first multiplexer MUX-L 436-L has a first input "0" coupled to the first bitline BL-L 412-L and a second input "1" coupled to the second bitline BL-R 412-R. In the depicted example, the first and second multiplexers MUX-L 436-L and MUX-R 436-R are coupled to receive the output signals from the pixel circuits that are coupled to the first and second bitlines BL-L 412-L and BL-R 412-R. As described in FIG. 3, the output signals received through the first and second bitlines BL-L 412-L and BL-R 412-R may be total output signals that include one or more vertically binned source follower output signals from one or more pixel circuits that are coupled to the first and second bitlines BL-L 412-L and BL-R 412-R.

In operation, the first multiplexer MUX-L 436-L is configured to select either the first input or the second to be output from the first multiplexer MUX-L 436-L in response to the first select signal SELECT-L 446-L of the mode select signal 446. For instance, in the depicted example, first multiplexer MUX-L 436-L is configured to output the signal received from the first bitline BL-L 412-L in response to a "0" on the first select signal SELECT-L 446-L of the mode select signal 446, or the signal received from the second bitline BL-R 412-R in response to a "1" on the first select signal SELECT-L 446-L of the mode select signal 446.

Similarly, in operation, the second multiplexer MUX-R 436-R is configured to select either the second input or the first to be output from the second multiplexer MUX-R 436-R in response to the second select signal SELECT-R 446-R of the mode select signal 446. For instance, in the depicted example, second multiplexer MUX-R 436-R is configured to output the signal received from the second bitline BL-R 412-R in response to a "0" on the second select signal SELECT-R 446-R of the mode select signal 446, or the signal received from the first bitline BL-L 412-L in response to a "1" on the second select signal SELECT-R 446-R of the mode select signal 446.

As shown in the depicted example, the output of the multi-mode binning circuit 434 is configured to generate a signal $V_{IN}$ 442 in response to the outputs of the first and second multiplexers MUX-L 436-L and MUX-R 436-R through first and second capacitors 438-L and 438-R, which are coupled to an input of an analog to digital converter ADC 440 that is configured generate a digital representation of the input signal $V_{IN}$ 442.

Therefore, during a readout operation with multi-mode binning circuit 434 operating in the first mode as illustrated in the example depicted in FIG. 4, horizontal binning is provided for the first and second columns of the pixel array that are coupled the first and second bitlines BL-L 412-L and BL-R 412-R. When one of the first and second bitlines BL-L 412-L and BL-R 412-R is coupled to receive a PDAF signal and the other one of the first and second bitlines BL-L 412-L and BL-R 412-R is coupled to receive a normal image signal, then the multi-mode binning circuit 434 may be operated in the second mode or in the third mode to preserve the PDAF signal or the normal image signal and drop the other normal image signal or PDAF signal as desired in accordance with the teachings of the present invention.

Furthermore, it is appreciated that with the horizontal binning provided with multi-mode binning circuit 434 readout speeds of the columns of the pixel array are increased by 2×. When horizontal binning provided with multi-mode binning circuit 434 is combined with vertical source follower binning as discussed above, it is appreciated that readout speeds of the pixel array are therefore increased by 4× when binning, which increases frame rates and reduces power consumption in accordance with the teachings of the present invention.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An imaging device, comprising:
   a pixel array including a plurality of pixel circuits arranged into rows and columns in the pixel array;
   a plurality of bitlines, wherein each bitline is coupled to a respective column of pixel circuits of the pixel array, wherein the plurality of bitlines is grouped into pairs of bitlines; and
   a plurality of binning circuits coupled to the plurality of bitlines, wherein each binning circuit coupled to a respective pair of bitlines and is configured to be responsive to a multi-mode select signal, wherein each binning circuit is configured to output a binned signal responsive to the first and second bitlines of the respective bitline pair in a first mode, wherein said each binning circuit is configured to output a first signal from a first bitline of the respective bitline pair in a second mode, wherein said each binning circuit is configured to output a second signal from the second bitline of the respective bitline pair in a third mode.

2. The imaging device of claim 1, wherein the plurality of pixel circuits includes a plurality of image sensing pixel circuits and a plurality of phase detection autofocus (PDAF) pixel circuits, wherein each one of the plurality of PDAF pixel circuits is interspersed among the plurality of image sensing pixel circuits in the pixel array.

3. The imaging device of claim 2, further comprising a plurality of photodiodes included in the pixel array, wherein the plurality of photodiodes include image sensing photodiodes and PDAF photodiodes, wherein each one of the image sensing pixel circuits includes an image sensing photodiode and each one of the PDAF pixel circuits includes a PDAF photodiode.

4. The imaging device of claim 3, wherein said each binning circuit is configured to operate in the first mode when the first bitline of the respective pair of bitlines is coupled to receive a first image signal from a first image sensing pixel circuit coupled to the first bitline of the respective bitline pair and when the second bitline of the respective bitline pair is coupled to receive a second image signal from a second image sensing pixel circuit coupled to the second bitline of the respective bitline pair.

5. The imaging device of claim 3, wherein the first bitline is further coupled to receive a third image signal from a third image sensing pixel circuit coupled to the first bitline of the respective bitline pair, wherein the second bitline is further coupled to receive a fourth image signal from a fourth image sensing pixel circuit coupled to the second bitline of the respective bitline pair.

6. The imaging device of claim 3, wherein said each binning circuit is configured to operate in the second mode or in the third mode when one of the first and second bitlines of the respective bitline pair is coupled to receive a first PDAF signal from a first PDAF pixel circuit coupled to said one of the first and second bitlines of the respective bitline pair and when an other one of the first and second bitlines of the respective bitline pair is coupled to receive a first image signal from a first image sensing pixel circuit coupled to said other one of the first and second bitlines of the respective bitline pair.

7. The imaging device of claim 6, wherein said one of the first and second bitlines of the respective bitline pair is further coupled to receive a second PDAF signal from a second PDAF pixel circuit coupled to said one of the first and second bitlines of the respective bitline pair, wherein said other one of the first and second bitlines of the respective bitline pair is further coupled to receive a second image signal from a second image sensing pixel circuit coupled to said other one of the first and second bitlines of the respective bitline pair.

8. The imaging device of claim 1, wherein each one of the plurality of pixel circuits comprises:
   one of the plurality of photodiodes configured to generate charge in response to incident light;
   a transfer transistor coupled to said one of the plurality of photodiodes;
   a floating diffusion coupled to the transfer transistor, wherein the transfer transistor is configured to transfer the charge generated in said one of the plurality of photodiodes to the floating diffusion in response to a transfer control signal;
   a reset transistor coupled between a voltage supply and the floating diffusion;
   a source follower transistor having a gate coupled to the floating diffusion; and
   a row select transistor coupled to the source follower transistor, wherein the source follower transistor and the row select transistor are coupled between the voltage supply and one of the plurality of bitlines.

9. The imaging device of claim 1, further comprising a color filter array disposed over the pixel array, wherein a pattern of color filters of the color filter array disposed over image sensing pixel circuits included in a first column of the pixel array coupled to the first bitline of the respective bitline pair is a same pattern of color filters of the color filter array disposed over image sensing pixel circuits included in a second column of the pixel array coupled to the second bitline of the respective bitline pair.

10. The imaging device of claim 9, wherein the respective bitline pair is a first bitline pair of the pairs of bitlines, wherein the pairs of bitlines further includes a second bitline pair including first and second bitlines of the second bitline pair, wherein the first bitline of the second bitline pair is coupled to a third column of the pixel array including image sensing pixel circuits having a different pattern of color filters disposed over the third column of the pixel array.

11. The imaging device of claim 10, wherein the third column of the pixel array is disposed between the first column of the pixel array and the second column of the pixel array.

12. The imaging device of claim 1, further comprising a plurality of analog to digital converters (ADCs), wherein each ADC is coupled to an output of a respective one of the plurality of binning circuits.

13. The imaging device of claim 12, wherein said respective one of the plurality of binning circuits comprises:
   a first multiplexer coupled to receive the multi-mode select and the first and second bitlines of the respective pair of bitlines, wherein the first multiplexer is configured to output the first bitline or the second bitline of the respective pair of bitlines in response to the multi-mode select signal;
   a second multiplexer coupled to receive the multi-mode select signal and the first and second bitlines of the respective pair of bitlines, wherein the second multiplexer is configured to output the second bitline or the first bitline of the respective pair of bitlines in response to the multi-mode select signal;
   a first capacitor coupled between an output of the first multiplexer and the output of said respective one of the plurality of binning circuits; and
   a second capacitor coupled between an output of the second multiplexer and the output of said respective one of the plurality of binning circuits.

14. An imaging system, comprising:
   a pixel array including a plurality of pixel circuits arranged into rows and columns in the pixel array;
   a plurality of bitlines, wherein each bitline is coupled to a respective column of pixel circuits of the pixel array, wherein the plurality of bitlines is grouped into pairs of bitlines;
   a control circuit coupled to the pixel array to control operation of the pixel array; and
   a readout circuit coupled to the pixel array to read out signals from the pixel array through the plurality of bitlines, wherein the readout circuit includes a plurality of binning circuits coupled to the plurality of bitlines, wherein each binning circuit coupled to a respective pair of bitlines and is configured to be responsive to a multi-mode select signal, wherein each binning circuit is configured to output a binned signal responsive to the first and second bitlines of the respective bitline pair in a first mode, wherein said each binning circuit is configured to output a first signal from a first bitline of the respective bitline pair in a second mode, wherein said each binning circuit is configured to output a second signal from the second bitline of the respective bitline pair in a third mode.

15. The imaging system of claim 14, further comprising function logic coupled to the readout circuit to store digital representations of the signals from the pixel array.

16. The imaging system of claim 14, wherein the plurality of pixel circuits includes a plurality of image sensing pixel circuits and a plurality of phase detection autofocus (PDAF) pixel circuits, wherein each one of the plurality of PDAF pixel circuits is interspersed among the plurality of image sensing pixel circuits in the pixel array.

17. The imaging system of claim 16, further comprising a plurality of photodiodes included in the pixel array, wherein the plurality of photodiodes include image sensing photodiodes and PDAF photodiodes, wherein each one of the image sensing pixel circuits includes an image sensing photodiode and each one of the PDAF pixel circuits includes a PDAF photodiode.

18. The imaging system of claim 17, wherein said each binning circuit is configured to operate in the first mode when the first bitline of the respective pair of bitlines is coupled to receive a first image signal from a first image sensing pixel circuit coupled to the first bitline of the respective bitline pair and when the second bitline of the respective bitline pair is coupled to receive a second image signal from a second image sensing pixel circuit coupled to the second bitline of the respective bitline pair.

19. The imaging system of claim 18, wherein the first bitline is further coupled to receive a third image signal from a third image sensing pixel circuit coupled to the first bitline of the respective bitline pair, wherein the second bitline is further coupled to receive a fourth image signal from a fourth image sensing pixel circuit coupled to the second bitline of the respective bitline pair.

20. The imaging system of claim 17, wherein said each binning circuit is configured to operate in the second mode or in the third mode when one of the first and second bitlines of the respective bitline pair is coupled to receive a first PDAF signal from a first PDAF pixel circuit coupled to said one of the first and second bitlines of the respective bitline pair and when an other one of the first and second bitlines of the respective bitline pair is coupled to receive a first image signal from a first image sensing pixel circuit coupled to said other one of the first and second bitlines of the respective bitline pair.

21. The imaging system of claim 20, wherein said one of the first and second bitlines of the respective bitline pair is further coupled to receive a second PDAF signal from a second PDAF pixel circuit coupled to said one of the first and second bitlines of the respective bitline pair, wherein said other one of the first and second bitlines of the respective bitline pair is further coupled to receive a second image signal from a second image sensing pixel circuit coupled to said other one of the first and second bitlines of the respective bitline pair.

22. The imaging system of claim 14, wherein each one of the plurality of pixel circuits comprises:
- one of the plurality of photodiodes configured to generate charge in response to incident light;
- a transfer transistor coupled to said one of the plurality of photodiodes;
- a floating diffusion coupled to the transfer transistor, wherein the transfer transistor is configured to transfer the charge generated in said one of the plurality of photodiodes to the floating diffusion in response to a transfer control signal;
- a reset transistor coupled between a voltage supply and the floating diffusion;
- a source follower transistor having a gate coupled to the floating diffusion; and
- a row select transistor coupled to the source follower transistor, wherein the source follower transistor and the row select transistor are coupled between the voltage supply and one of the plurality of bitlines.

23. The imaging system of claim 14, further comprising a color filter array disposed over the pixel array, wherein a pattern of color filters of the color filter array disposed over image sensing pixel circuits included in a first column of the pixel array coupled to the first bitline of the respective bitline pair is a same pattern of color filters of the color filter array disposed over image sensing pixel circuits included in a second column of the pixel array coupled to the second bitline of the respective bitline pair.

24. The imaging system of claim 23, wherein the respective bitline pair is a first bitline pair of the pairs of bitlines, wherein the pairs of bitlines further includes a second bitline pair including first and second bitlines of the second bitline pair, wherein the first bitline of the second bitline pair is coupled to a third column of the pixel array including image sensing pixel circuits having a different pattern of color filters disposed over the third column of the pixel array.

25. The imaging system of claim 24, wherein the third column of the pixel array is disposed between the first column of the pixel array and the second column of the pixel array.

26. The imaging system of claim 14, wherein the readout circuit further includes a plurality of analog to digital converters (ADCs), wherein each ADC is coupled to an output of a respective one of the plurality of binning circuits.

27. The imaging system of claim 26, wherein said respective one of the plurality of binning circuits comprises:
- a first multiplexer coupled to receive the multi-mode select signal and the first and second bitlines of the respective pair of bitlines, wherein the first multiplexer is configured to output the first bitline or the second bitline of the respective pair of bitlines in response to the multi-mode select signal;
- a second multiplexer coupled to receive the multi-mode select signal and the first and second bitlines of the respective pair of bitlines, wherein the second multiplexer is configured to output the second bitline or the first bitline of the respective pair of bitlines in response to the multi-mode select signal;
- a first capacitor coupled between an output of the first multiplexer and the output of said respective one of the plurality of binning circuits; and
- a second capacitor coupled between an output of the second multiplexer and the output of said respective one of the plurality of binning circuits.

* * * * *